Jan. 28, 1930. O. G. SIMMONS Re. 17,573

METHOD OF AND APPARATUS FOR GENERATING TAPERED GEARS

Original Filed Jan. 5, 1922 4 Sheets-Sheet 1

INVENTOR
OLIVER G. SIMMONS.

BY Kerr Hudson & Kent.

ATTORNEYS

Jan. 28, 1930. O. G. SIMMONS Re. 17,573

METHOD OF AND APPARATUS FOR GENERATING TAPERED GEARS

Original Filed Jan. 5. 1922 4 Sheets-Sheet 2

INVENTOR
OLIVER G. SIMMONS

Kerr Hudson & Kent.

ATTORNEYS

METHOD OF AND APPARATUS FOR GENERATING TAPERED GEARS

Original Filed Jan. 5. 1922 4 Sheets-Sheet 3

INVENTOR

OLIVER G. SIMMONS.

Howe, Hudson & Kent

ATTORNEYS

METHOD OF AND APPARATUS FOR GENERATING TAPERED GEARS

Original Filed Jan. 5, 1922 4 Sheets-Sheet 4

INVENTOR
OLIVER G. SIMMONS.

Kerr Hudson & Kent

ATTORNEYS

Reissued Jan. 28, 1930

Re. 17,573

UNITED STATES PATENT OFFICE

OLIVER G. SIMMONS, OF LAKEWOOD, OHIO, ASSIGNOR, BY MESNE ASSIGNMENTS, TO SIMMONS METHOD HOB COMPANY, A CORPORATION OF OHIO

METHOD OF AND APPARATUS FOR GENERATING TAPERED GEARS

Original No. 1,588,060, dated June 8, 1926, Serial No. 527,176, filed January 5, 1922. Application for reissue filed July 15, 1929. Serial No. 378,543.

My invention relates to a method of and apparatus for generating, upon the molding principle, as distinguished from forming tapered, as distinguished from bevel, spur and helical spur gears and racks, or cutters or other articles resembling gears.

In accordance with the broad aspect of my invention, the cutter which generates teeth in the gear, rack or other blank moves, during the act of tooth cutting or generation while moving across the face of the blank, toward or away from the axis of the blank at any suitable rate with respect to the speed of traverse of the blank by the cutter. The rate of movement of the cutter toward or away from the axis of the blank may be uniform throughout the traverse of the blank by the cutter, in which case a gear or rack of constant or uniform taper results; or such rate of movement may be non-uniform or vary as the cutter proceeds across the blank, in which case the resultant gear or rack may have portions having different tapers, may have a portion which is tapered joining a portion which is not tapered, or the rate of motion may so vary as to produce a curvilinear outline in the periphery of the finished gear or rack.

In accordance with a further specific aspect of my invention, and that herein specifically disclosed, the cutter is a hob or hobbing cutter whose teeth are helically disposed and continuously rotated while traversing the continuously rotating blank in a direction in general longitudinally of the axis of the blank, the hob simultaneously moving toward or away from the axis of the blank at suitable rate to produce the taper effects as aforesaid. The longitudinal movement of the blank with respect to the hob may be in a direction longitudinally of the axis of rotation of the blank or may be in a direction at an angle to the axis of rotation of the blank corresponding with the angle of taper of the finished gear.

My invention resides in the method of and apparatus for producing tapered spur or helical gears having generated teeth, and resides also in tapered helical spur or tapered spur gears having generated teeth.

For an understanding of my method, for an illustration of some of the forms my apparatus may take, and for an illustration of the gears and the like produced by my method and apparatus, reference is to be had to the accompanying drawings, in which.

Figure 1:
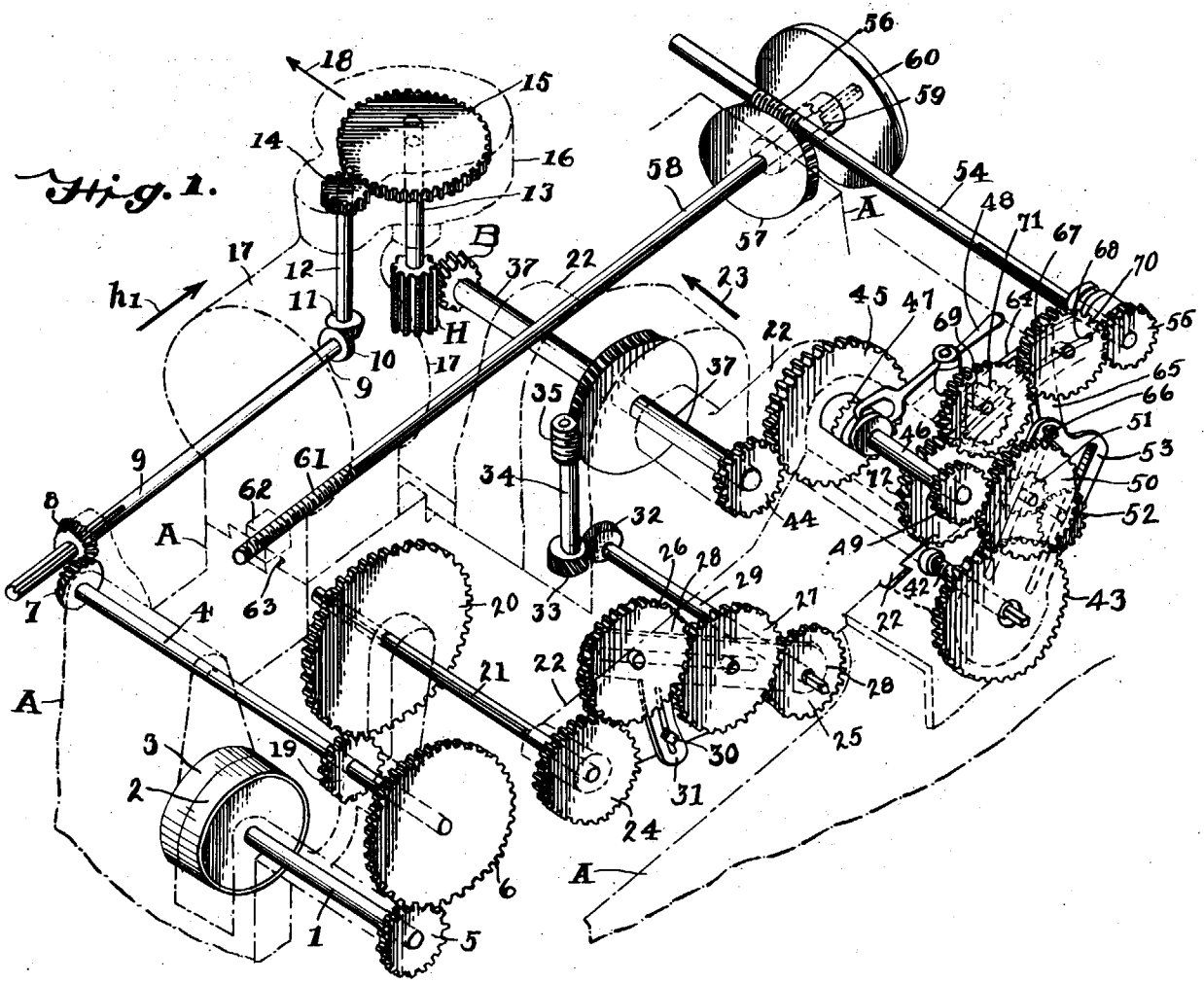
Figure 1 is a skeletonized view in perspective of a hobbing machine embodying my invention and utilizable in practicing my invention.

Referring to Figs. 1 to 4 inclusive, there is illustrated, by way of one example merely of numerous hobbing machines, a Lees-Bradner hobbing machine which may readily be modified for purposes of my invention. The primary driving shaft is indicated at 1 and is rotated by pulley 2 fast thereon, by belt, not shown, the loose pulley 3 simply running idly when the belt is shifted thereto when the shaft 1 is to be stopped. The shaft 1 drives the shaft 4 through the gears 5 and 6. Secured upon the shaft 4 is the bevel gear 7 meshing with and driving the bevel gear 8 splined upon the shaft 9, which in turn drives the bevel gear 10 meshing with and driving the bevel gear 11 which drives the shaft 12 which drives the arbor 13 through the gears 14 and 15. Upon the arbor or shaft 13 is secured the hob or hobbing cutter H whose teeth are disposed in helical sequence. The shaft 12, arbor 13 and gears 14 and 15 are supported by or within the cutter head 16, which is supported upon and rotatable with respect to the cutter head support 17 about the axis of the shaft 9, the bevel gear 11 rolling upon bevel gear 10 during such adjustment, which is utilized for tilting the axis of the arbor or shaft 13 from true vertical position, in the direction of the arrow 18, through a small angle corresponding with the angle of the helix of the hob teeth, as well understood in hobbing machine practice.

Upon the shaft 4 is a pinion 19 which drives the gear 20 with respect to which the longitudinally movable shaft 21 is splined. The shaft 21 is supported by and has a bearing in the carriage 22, which is movable in the direction of the arrow 23, that is, movable at right angles to the longitudinal axis of the shaft 9, upon the base A. The shaft 21, driven by gear 20, drives the pinion 24 which drives the gear 25 through the intermediate gears 26, 27 carried by a bracket 28 swingable about the axis of the shaft 29 upon which the gear 25 is secured; the bracket 28 may be clamped in the operative position shown or in inoperative position by the clamping screw 30 extending through a slot in the arm 31 on the bracket 28, the screw 30 being threaded into a portion of the carriage 22. The shaft 29 drives the spiral gear 32, which in turn drives the spiral gear 33 secured upon the shaft 34 which in turn drives the worm 35 meshing with the worm gear 36 secured upon the work spindle or shaft 37. The work or blank to be operated upon by the hob H is indicated at B and is mounted upon the shaft 37 as an arbor, Fig. 1, or generally upon an arbor 38, Fig. 2, which is co-axial with and driven with the shaft 37, the arbor 38 being supported at its far end in an outboard supporting member 39 adjustable parallel to the axis of the shaft 37 an arbor 38 upon guideways 40 of the carriage 22, and being clamped in suitable position by the clamping bolts 41.

The carriage 22 is moved in the direction of the arrow 23, or the reverse, by the lead screw 42 rotated by the gear 43 driven from the shaft 37 through the pinion 44, gear 45, loose upon shaft 46, but coupled thereto by the coupling 47 operated by the lever 48. The shaft 46 drives the gear 49, which drives the gear 50 secured to the pinion 51 which drives the pinion 52 which drives the aforesaid gear 43, gear 50 and pinions 51 and 52 having bearings on members adjustable longitudinally in slots in the bracket member 53. The bracket 53 is clamped to a portion of the carriage 22.

The shaft 54 is mounted in bearings carried by the base A of the machine (not by carriage 22), and there is splined thereon for rotating the same the gear 55, which may be driven by shaft 46 through a suitable train of gearing carried by the bracket 53, in which case the bracket 53 is in another of its positions to which it may be adjusted, and when the gear 55 is driven from the shaft 46 the lead screw 42 is inoperative, that is, is not driven by shaft 46. The shaft 54 carries a worm 56 driving the worm gear 57 loosely journaled on the transversely extending shaft 58, but capable of being coupled to the shaft 58 for rotating the same by the coupling 59, one of whose members is secured to the hand wheel 60 splined upon the shaft 58. At its other end the shaft 58 is provided with a lead screw 61 engaging in the nut 62 secured to the cutter head support 17, whereby upon rotation of the shaft 58 the support 17 and the cutter head 16 and the hob H are moved parallel to the shafts 58 and 59 upon the guide structure 63 on the base A of the machine upon which the carriage 22 is also movable, but in a direction at right angles to the direction of movement of the member 17.

The shafts and gearing, from shaft 21 to pinion 52, all have bearings upon and move longitudinally in the direction of the arrow 23 with carriage 22.

The parts thus far described are those of the standard Lees-Bradner machine, and are per se not my invention.

In the ordinary operation of the machine the hob H rotates continuously, as does also the work or blank B, which latter at the same time is fed in the direction of the arrow 23 past the hob, producing an ordinary spur gear which is not tapered, that is, is of the same diameter at the peripheries of its opposite end faces. Or by similar movements, but with a suitably different speed or rotation of the shaft 37 as may be procured by different indexing gears 26 and 27, and by a suitable definite speed of longitudinal movement of the work B in the direction of the arrow 23, procured by suitable definite feed gears in the train between the shafts 46 and 42, a helical gear will be produced upon the blank B, but of the same diameter at its opposite end faces.

Or by disconnecting the lead screw 42, in which case the carriage 22 will not be fed longitudinally, and coupling the shaft 54 to the shaft 46 through the gear 55, the hob H will be fed into the blank B and produce a concave worm wheel or gear.

However, for purposes of my invention, to produce tapered spur helical or spur gears, the hob H and the work B are rotated continuously at suitable relative speeds, and the work B is fed longitudinally in the direction of the arrow 23, as in the old practice above described, but, in addition, the hob H is fed toward the shaft 37 and work B at a suitable rate compared with the speed of longitudinal movement of the work B in the direction of the arrow 23, whereby a tapered spur or helical gear is produced having generated teeth.

While the carriage 22 is being fed forward in the direction of the arrow 23 in the last described operation, the hob H is simultaneously fed toward the shaft 37 by the screw 58 which is driven by the gear 55 upon shaft 54. In other words, in accordance with my invention, the lead screw 58 is rotating simultaneously with the longitudinal movement of the carriage 22 as procured by the simultaneously rotating lead screw 42. That is to say, in accordance with my invention, I produce tapered helical or spur gears with generated teeth by simultaneously employing the feeds effected by lead screws 42 and 58. This additional simultaneous operation of the lead screw 58 is accomplished by providing an additional bracket 64 pivoted and slidable longitudinally upon the shaft 54, the bracket 64 being carried by the carriage 22 by connecting the bracket 64 through the link 65, which at its one end is pivoted to the bracket 53 at 66 and which is pivoted at its other end upon a bolt 67 securing the link 65 to the bracket 64 by engagement of the bolt in the slot 68 in bracket 64. Upon members secured to the bracket 64 and adjustable to suitable positions in the aforesaid slot 68 are pinions or gears 69 and 70 meshing with each other and the latter meshing with pinion 55. Secured to the gear 69 is a pinion 71 meshing with the gear 72 secured upon the shaft 46, whereby the shaft 46 drives the lead screw 58 at the same time that it drives the lead screw 42. The train of gears 72, 71, 69, 70 and their bracket 64, is an attachment or novel appliance constituting a feature of my invention, and is the means for accomplishing my method, which is characterized by the fact that while the cutter, of whatsoever suitable type, is traversing the blank or work B from one end face to the other, it is simultaneously at suitable rate fed into the blank or work B to produce a tapered gear or the like whose teeth are generated on the molding principle, as distinguished from formed. In the example just described, the hob H, while it is traversing the work or blank B from its one end face to the other, due to longitudinal movement of the carriage 22 in the direction of the arrow 23, is fed toward the axis of rotation of the shaft 37 and work B by the lead screw 58.

Figure 5:
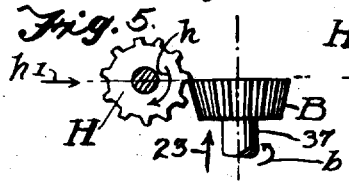
Fig. 5 is a fragmentary diagrammatic view illustrating the movements of hob and blank.

The mode of operation just described is diagrammatically illustrated in Fig. 5, where it will be understood that the hob H, while rotating in suitable direction, for example, that indicated by the arrow $h$, and while the work B is rotating in the direction of the arrow $b$ and is fed longitudinaly in the direction of the arrow 23, is simultaneously fed in the direction of the arrow $h^1$.

Figure 7:
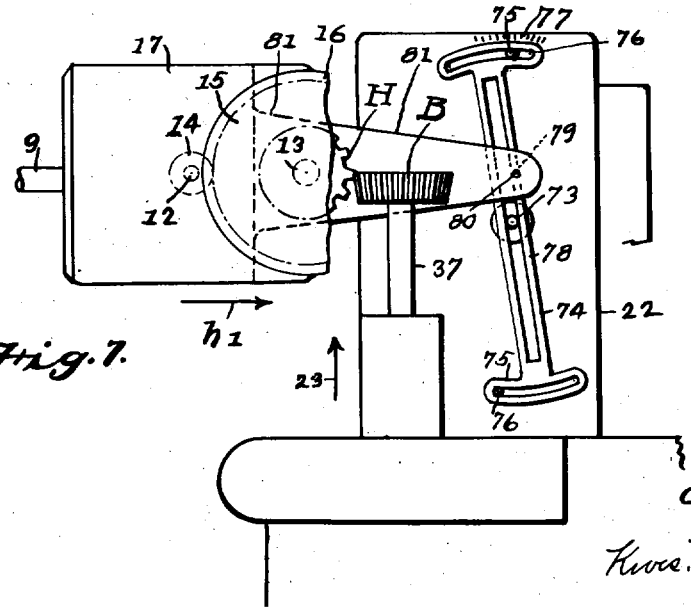
Fig. 7 illustrates in plan view a modified construction of a hobbing machine having the movements indicated in Fig. 5 and corresponding in general with Figs. 1 and 2.

Referring to Fig. 7, there is shown a modified means for feeding the hob H toward the blank B or its shaft 37 simultaneously with movement of the work B in the direction of the arrow 23, without recourse to the lead screw 58. This is accomplished by pivoting at 73, to the carriage 22, the guide member 74, which may be clamped in any suitable position by the bolts 75, threaded into member 22, and extending through slots 76 in the ends of the member 74, a suitable index scale 77 being provided for indicating suitable or desired taper angles. The member 74 has the longitudinally extending slot or channel 78, in which engages a roller or slide 79 secured by the pivot bolt 80 to the arm 81 secured to the cutter head support 17.

As the hob H and work B rotate and the work B is moved in the direction of the arrow 23 by the carriage 22, the guide member 74 draws the arm 81 and therefore the member 17 and hob H toward the right, in the direction of arrow $h^1$, toward the axis of rotation of the work B, producing a tapered gear.

Gears of different tapers are produced by adjusting the member 74 to different positions.

Figure 15:
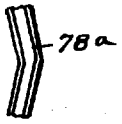
Figs. 15 and 16 show modified forms of guide bar which may replace the cutter guide bar shown in Fig. 7.
Figure 16:
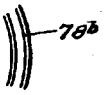

While the slot 78 is shown as straight, it will be understood that it may comprise a series of straight portions disposed at different angles with respect to each other, as shown at $78^a$ in Fig. 15, or it may be a curved slot of any form as indicated at $78^b$ in Fig. 16, in which latter case the outline of the gear, instead of being a straight taper, will be correspondingly curved. When the slot 78 is curved to accord with the arc of a circle, of an ellipse or other figure, the roller or slide 79 in following such curved slot would cause corresponding movement on the part of the hob H and so produce a globoidal, spheroidal, ellipsoidal or other gear having generated tapered spur or helical tapered spur teeth adapted to mesh with the teeth of a like gear whose axis is parallel.

While in the foregoing arrangements the movement of the hob H has been at right angles to the axis of rotation of the work B, that is, at right angles to the axis of the shaft 37, for producing the taper effect, it will be understood that any other equivalent arrangement may be employed.

Figure 6:
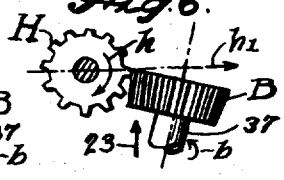
Fig. 6 is a fragmentary diagrammatic view illustrating a modification of the relative movements of hob and blank.

For example, as indicated diagrammatically in Fig. 6, the axis of the work B, that is, the shaft 37, may be set at such angle to the arrow 23, which indicates the direction of movement of the carriage 22, as to correspond with the angle of taper desired in the finished gear. In this case the hob H is not fed in the direction of the arrow $h^1$ (or the reverse), but tapering of the gear is nevertheless obtained because the axis of the work B, that is, the shaft 37, is set at a suitable angle, but nevertheless moved in the direction of the arrow 23, and not axially.

Figure 8:
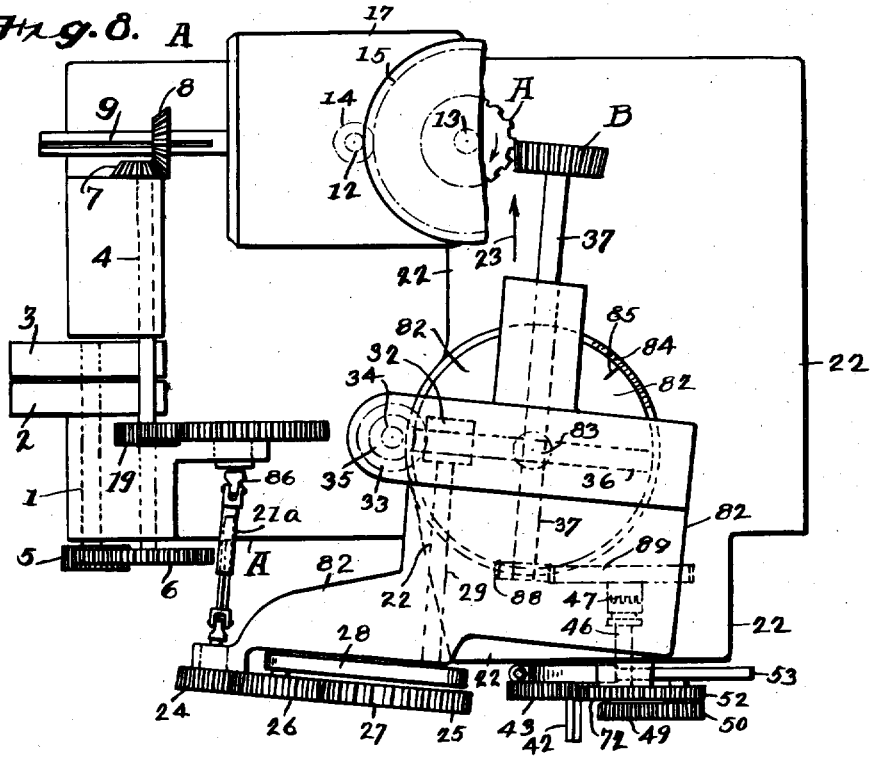
Fig. 8 illustrates in plan view a modified construction of hobbing machine for producing the movements of Fig. 6.

An arrangement for producing this type of relative movement between hob and work is indicated in Fig. 8. The hob H is, as before, driven by the shaft 1. In this case, however, the shaft 37 is carried by and has a bearing in a housing 82 pivoted on a vertical pivot 83 carried by the carriage 22 which, as before, is movable in the direction of the arrow 23. The housing 82 is moved upon its pivot 83 to adjust the shaft 37 to proper angle with respect to the arrow 23, and the housing 82 is clamped in such position to the carriage 22. A scale 84 upon the carriage 22 coacting with an index 85 on the housing 82 serves for adjusting the housing 82 to proper angle. The shaft 37 is driven by the gear wheel 20 through the shaft $21^a$ through a universal joint 86, and the shaft 21 drives the gear 24 through a similar universal joint 87. The bracket 28 in this case is carried by the housing 82, and supports the intermediate gears 26 and 27, the latter driving the gear 25 upon the shaft 29 carried by the housing 82 and driving the spiral gear 32 which drives the spiral gear 33 secured upon the shaft 34 which drives the worm 35 which drives the worm gear 36 secured upon the shaft 37.

The globoidal gear 88 is secured upon the shaft 37 and drives the gear 89 which, through the coupling 47, drives the shaft 46. The gear 49, coupling 47 and the shaft 46 are mounted upon the carriage 22, which is moved in the direction of the arrow 23 by the lead screw 42 driven from the shaft 46 through a suitable train of gears carried by the adjustable bracket 53 mounted upon the carriage 22.

The mechanism causes simultaneous rotation of the hob H and work B and movement of the work B in the direction of the arrow 23 while its axis or shaft 37 is inclined as shown. In this way, as hereinbefore described, tapered helical or spur gears with generated teeth are produced.

Figure 9:
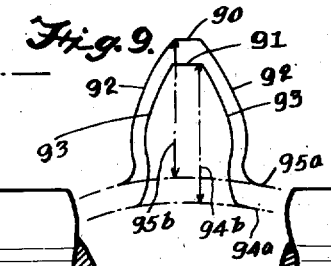
Fig. 9 illustrates the tooth contours at opposite end faces of the tapered gear.
Figure 10:
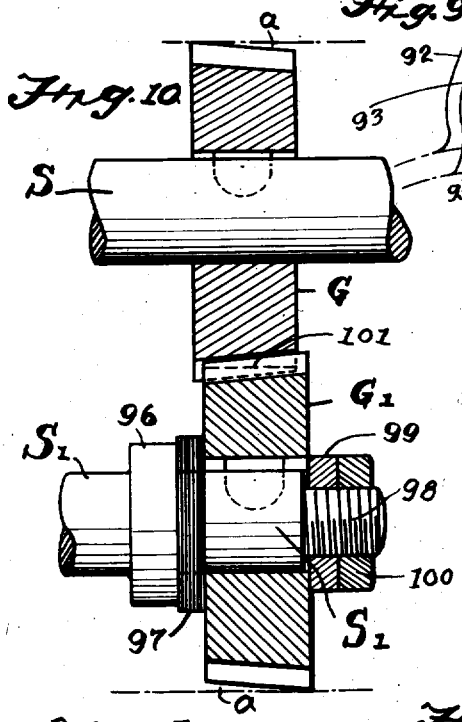
Fig. 10 is a sectional view, partly in elevation, illustrating my tapered spur gears in intermeshing relation.

The tapered spur gears produced in accordance with this invention have unusual characteristics, among which are the following. As indicated in Fig. 9, the circumferential width of the tip or point 90 of a gear tooth is narrower than the circumferential width 91 of the tip or point of the same tooth at the opposite face of the gear where the gear has lesser external diameter while the breadth of the tooth as measured between its sides 92, 92 at the end or face of great diameter is greater than the breadth or thickness of the tooth between its faces 93, 93 at the end or face of smaller diameter. As indicated in Fig. 9, the sides of the gear teeth are represented by involute curves, though it is to be understood that my invention is not limited in these respects. In the example illustrated, the involute curve 92 is the same as the involute curve 93, but the curve 92 is longer than the curve 93, the curve 92 corresponding with the curve 93, but having additional length as occasioned by the greater diameter of the gear at the opposite end from that where the gear face is represented by the curve 93. The teeth taper as to their thickness from one face of the gear to the other, but nevertheless have true generated surfaces. Similarly, the surfaces of the spaces between the teeth complementarily taper and are truly generated surfaces and the pitch circle does not change in diameter from one face of the gear to the other. $94^a$ and $95^a$ represent the root circles for the teeth at opposite faces or ends of the gear, the root circle diminishing in diameter from that end of the gear of larger diameter to the opposite end. The height or depth of the tooth is constant from one end or face of the gear to the other, in that the depth or height $94^b$ of the tooth at that end of the gear of smaller diameter is equal to the depth or height $95^b$ of the same tooth at that end of the gear of greater diameter. The diameter of the root circle and the height or depth of the tooth in every plane from end face to end face of the gear are such that when the gear is in proper meshing position with a complemental tapered gear of the same characteristics, there is clearance between the top of the tooth and the root of the tooth of the complemental gear, that is, the teeth of one of the gears of a pair will not strike or engage the roots of the teeth of the complemental gear. This clearance is indicated in Figs. 9 and 10; and this matter of clearance and avoidance of interference obtain for all pressure angles, including low pressure angles, as 20 degrees and less. The characteristic of constancy of tooth height or depth is one of the features which differentiate my tapered gear from the so-called bevel or miter gear, of which it is characteristic that the height or depth of the tooth diminishes from that end of the gear of greater diameter to the end of lesser diameter. My tapered gear is further differentiated from a miter or bevel gear in that in a miter or bevel gear the diametral or circular pitch of the teeth varies from one end face of the gear to the other, while it is characteristic of my tapered gear that the diametral or circular pitch of the teeth is constant from one end face of the gear to the other.

Figure 11:
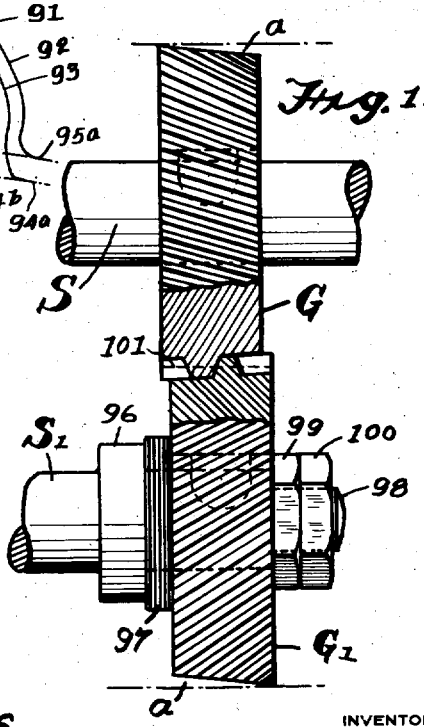
Fig. 11 is a view, partly in section, illustrating my helical tapered gears in meshing relation.

When a pair of such tapered gears are brought to intermeshing relation as indicated in Figs. 10 and 11, the teeth contact with each other throughout their lengths or throughout that part of their lengths which overlap longitudinally of their axes of rotation. Furthermore, these lines of contact are parallel to their axes of rotation, the line of contact between a pair of teeth shifting from near the tip of one and the root of the other to the root of the one and the top of the other as they roll upon each other, but the line of contact always remaining parallel to their axes of rotation, in the case of both spur and helical spur tapered gear with generated teeth. When the sides of the teeth are involute curves, the teeth of the different tapered gears truly roll upon each other and maintain contact with each other from end to end along lines which are parallel to their axes of rotation.

Referring to Fig. 10, G and $G^1$ are tapered spur gears with generated teeth in accordance with my invention. They are secured or keyed to their respective shafts S and $S^1$, with the face of large diameter of the gear G and the face of small diameter of the gear $G^1$ adjacent each other. On the shaft $S^1$ may be provided a shoulder 96, between which and the gear $G^1$ are disposed the shim washers 97 of equal or varying thicknesses. On the shaft $S^1$ is a threaded portion 98 upon which is threaded a nut 99 holding the gear G against the shims 97 and locked by the lock nut 100. By choosing or varying the total thickness of the shims 97 the gear $G^1$ is shifted longitudinally of the axis of shaft S of the gear G and so the play or back lash between the teeth of gears G and $G^1$ may be made anything suitable or desirable, and may be entirely eliminated. And as the gears wear after use, the play or back lash between their teeth may be reduced or eliminated from time to time by removing one or more shims 97. Similarly, when the distances between the centers of shafts S and $S^1$ vary, the back lash may be reduced or eliminated by adjusting the gears to suitable positions longitudinally of their shafts or either of them.

By way of example, it may be stated that the effective distance between the centers of a pair of these tapered gears may be varied one unit of length for ten units of length of adjustment of one of the gears longitudinally of the axis if the taper angle *a* of each gear, Figs. 10 and 11, is approximately two degrees and fifty-one minutes.

The dotted line 101, parallel to the axis of the gears G, $G^1$, indicates the line of contact between teeth, as above referred to.

In Fig. 11 the gears G and $G^1$ are shown as tapered helical spur gears, the back lash or play between whose teeth may be similarly adjusted by adjusting one of the gears, as $G^1$, longitudinally of its shaft.

In producing tapered gears, either spur or helical, as above described, the gear blank may be cylindrical or of other suitable form. Or, and preferably, it is conical, the pitch of the cone corresponding substantially with the taper of the finished gear.

While I have hereinbefore referred to the production of tapered spur gears, it will be understood that kindred devices may be similarly produced.

Figure 2:
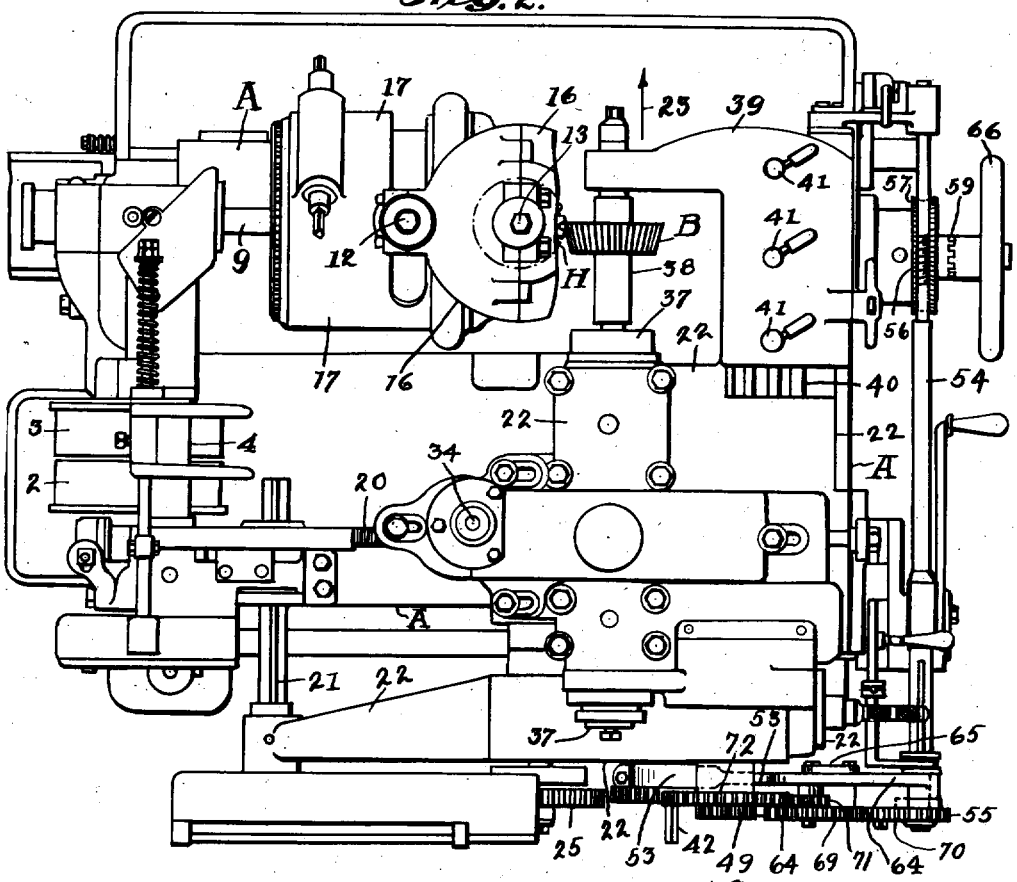
Fig. 2 is a plan view of such a hobbing machine.
Figure 3:
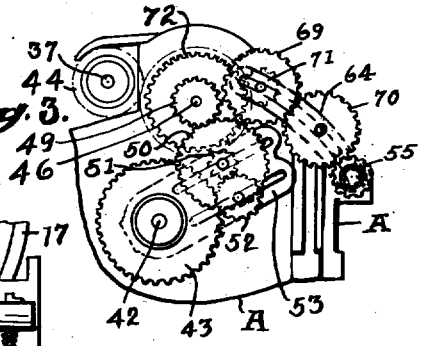
Fig. 3 is a fragmentary end elevational view of part of the gearing of the apparatus shown in Figs. 1 and 2 and constituting a novel attachment for practicing my invention.
Figure 4:
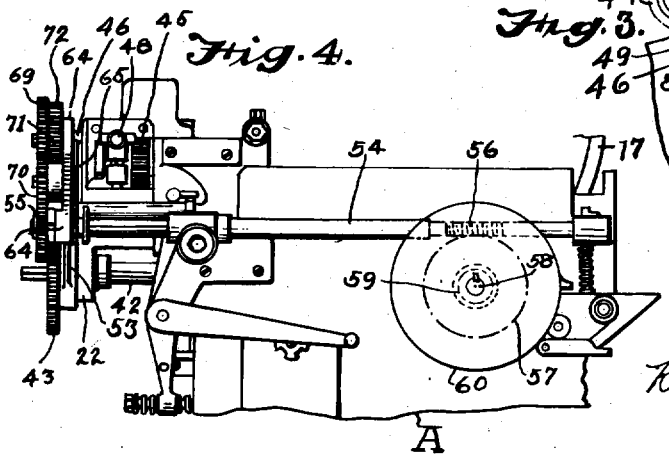
Fig. 4 is a fragmentary side elevational view of the same gearing and additional parts.
Figure 13:
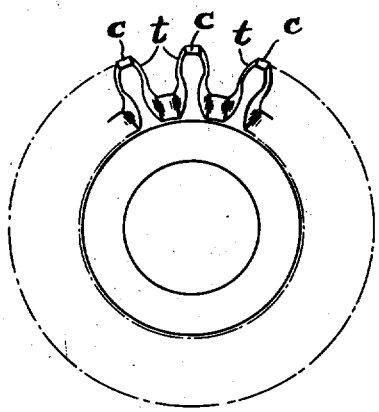
Fig. 13 is an elevation of the left face of the cutter of Fig. 12.
Figure 12:
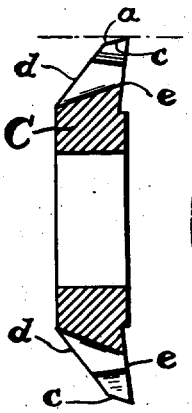
Fig. 12 is a sectional view of a multi-tooth cutter in accordance with my invention.
Figure 14:
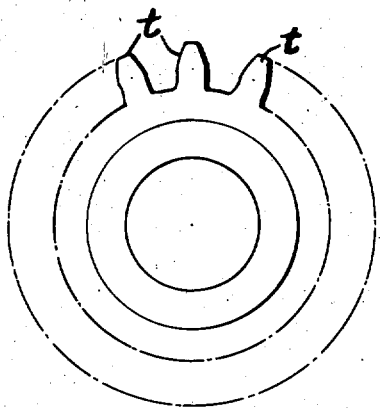
Fig. 14 is an elevation of the right face of the cutter of Fig. 12.

For example, as indicated in Figs. 12, 13 and 14, a multi-tooth circular cutter (utilizable for various purposes, as for example, generation of threads in a blank rotating on an axis substantially at right angles to the axis of rotation of the cutter) may be similarly produced by a hob, as H, by mounting the cutter blank upon the shaft 37, Figs. 1, 7 and 8, or mandrel 38, Fig. 2, in the position occupied by the blank B. The cutter C will then have generated in it teeth *t* which, for cutting purposes, however, have a relatively great taper, as for example, a taper angle *a* of twenty degrees, more or less, as may be required. The surfaces of the teeth and the spaces between them are generated by the hob which simultaneously tapers the teeth. The blank before cutting by the hob may be conical, the angle *a* being predetermined in turning up the blank. Or the blank may be cylindrical and the hob will generate the tapering surfaces *c*. Before cutting the blank of the hob it may be turned at the back of the teeth to the surface *d*. Similarly, the inclined surface *e*, for giving the teeth rake, may be turned in the blank before it is cut, and ground after the completed cutter has been hardened.

A cutter of this type may be produced much more quickly and cheaply than by the milling process heretofore commonly employed. Furthermore, by my method of producing a cutter, its teeth are generated and are of correct shape and contour, as distinguished from the teeth produced by milling, which are only approximately correct in dimensions and contour. It will be understood that the cutter produced as above described has substantially the same characteristics as a tapered spur gear formed by the present methods and having the same taper. A cutter so formed will mesh with a like cutter or with a gear formed with the same taper.

These facts are true of my cutters produced by hobbing as above described, or when produced by reciprocating a multi-tooth cutter (Fellows) or a single cutter or element across the face of the cutter blank and simultaneously moving the cutter toward the axis of the blank.

It will be understood that while I have hereinbefore described the method of producing the gears by hobbing, it will be understood that tapered gears with generated teeth may also be formed by reciprocating a multi-tooth cutter (Fellows) or a single cutter tooth or element across the face of the blank in a direction inclined to the axis of the blank to produce the taper effect.

The gears in accordance with my invention are not bevel gears, but are true tapered gears with generated teeth.

These gears have numerous applications, among which are the following:

They may be employed as the timing gears of an internal combustion engine forming a driving train between the crank shaft of the engine and the cam shaft thereof. Generally three gears are comprised in such a train, and the middle of the three may be mounted upon a shaft, as $S^1$, whereby it may be adjusted longitudinally of such shaft for reducing the back lash between itself and the two outer gears, or if desired, two or all of the three gears may be so longitudinally adjustable upon their shafts. For this purpose, generally the tapered helical gears may be employed.

Both tapered spur and helical gears may also be employed as those of the transmission of an automobile intervening between the motor or engine and the rear or driving axle.

These tapered gears are also of use in printing presses for preventing lost motion between elements which should always remain in perfectly definite relation with respect to each other. For example, in multi-color presses, by employing these tapered gears which eliminate play or back lash, perfect register of the different applications of color is obtainable. Furthermore, in cylinder printing presses slight oscillation or variation from uniformity of rotation of the printing cylinder may likewise be eliminated.

This type of gear is also of value in machine tools, including hobbing machines of the character herein described, wherein it is desirable to prevent variations from constancy of ratios of speeds of rotation of the various parts, and these gears are therefore in such machine tools conducive to greater accuracy in the product of those tools.

In my spur and helical tapered spur gears hereinbefore described, the pressure angle does not vary in magnitude from one end face of the gear to the other and considering two intermeshing tapered gears, as in Figs. 10 and 11, the pressure angle of the contact between the teeth of the two gears of a pair remains constant from one end face to the other of the gears.

Tapered spur helical gears formed in accordance with the method of the present application have the advantage that the lateral thrust between two meshing gears due to the taper of the gears and the lateral thrust between the gears due to the helical disposition of the teeth are in opposite directions so that one tends to counterbalance the other. In fact by properly proportioning the helix angle of the teeth and the taper of the gears, the lateral thrusts may be made to counterbalance each other so that when the two intermeshing tapered helical gears are driven under load, the lateral thrust is eliminated. If the driven gear be mounted to slide longitudinally of its shaft it may be shifted while it is being driven under load in either direction by the application of a very slight pressure thereto.

It will be understood with respect to the appended claims that for the sake of brevity the term "taper" includes not only single tapers, as indicated in Figs. 10 and 11, but several different tapers and curved tapers as well.

What I claim is:

1. The method of producing tapered spur, or tapered helical spur gears, cutters and the like having a constant circular pitch which comprises cutting a blank by a hobbing cutter to generate a tooth, by simultaneously producing relative movement between hobbing cutter and blank with respect to each other to cause the generating action of the hobbing cutter to take place at different distances from the axis of the blank and causing the hobbing cutter to cut the top surface of the tooth parallel to the root surface thereof in passing from end to end of the blank.

2. The method of producing tapered spur, or tapered helical spur gears, cutters and the like having a constant circular pitch, which consists in generating a tooth in a blank by a hobbing cutter whose distance from the axis of the blank varies while generating the tooth and causing the hobbing cutter to cut the top surface of the tooth parallel to the root surface thereof in passing from end to end of the blank.

3. The method of producing tapered spur or tapered helical spur gears, cutters and the like having a constant circular pitch, which comprises simultaneously rotating a hobbing cutter and a blank to generate teeth therein, while moving longitudinally of the blank, and simultaneously varying the distance between the hobbing cutter and the axis of the blank and causing the cutter in generating the teeth to cut the top surfaces of the teeth parallel to the root surfaces thereof.

4. The method of producing tapered spur, or tapered helical spur gears, cutters and the like having a constant circular pitch, which comprises rotating a hobbing cutter and a blank in tooth-generating engagement with each other, and varying the distance of the hobbing cutter from the axis of the blank as the hobbing cutter proceeds longitudinally of the blank and causing the cutter in generating the teeth to cut the top surfaces of the teeth parallel to the root surfaces thereof.

5. The method of producing tapered spur, or tapered helical spur gears, cutters and the like having helical or inclined teeth and having a constant circular pitch, which comprises cutting in a blank generated helical or inclined teeth by movement of a hobbing cutter longitudinally of the blank at an angle to the axis thereof, and simultaneously varying the distance between the hobbing cutter and the axis of the blank and causing the hobbing cutter to cut the top surfaces of the teeth parallel to the root surfaces thereof.

6. The method of producing tapered spur, or tapered helical spur gears, cutters and the like having helical or inclined teeth and having a constant circular pitch, which comprises rotating a hobbing cutter and a blank, in engagement with each other to cut in the blank by movement longitudinally thereof generated teeth, the relative speeds of rotation of the hobbing cutter and blank being such as to cause said teeth to be inclined with respect to the axis of the blank, and simultaneously varying the distance between said hobbing cutter and the axis of the blank and causing the cutter in generating the teeth to cut the top surfaces of the teeth parallel to the root surfaces thereof.

7. The method of producing tapered spur, or tapered helical spur gears, cutters and the like having helical or inclined teeth and having a constant circular pitch, which comprises simultaneously rotating a hobbing cutter and a blank to generate helical or inclined teeth therein while moving longitudinally of the blank, and simultaneously varying the distance between the hobbing cutter and the axis of the blank and causing the cutter to cut the top surfaces of the teeth parallel to the root surfaces thereof.

8. Apparatus for producing tapered spur, or tapered helical spur gears, cutters and the like, having a constant circular pitch, comprising means for supporting and rotating a blank, a hobbing cutter, means for rotating and moving said hobbing cutter longitudinally of the rotating blank for producing a tooth therein, and means for simultaneously varying the distance between the cutter and the axis of the blank.

9. Apparatus for producing tapered spur, or tapered helical spur gears, cutters or the like having helical or inclined teeth and having a constant circular pitch, comprising means for supporting and rotating a blank, a hobbing cutter, means for causing movement of said cutter longitudinally and circumferentially of said blank for producing a tooth therein, and means for simultaneously varying the distance between the hobbing cutter and the axis of the blank.

10. A hobbing machine for producing tapered spur, or tapered helical spur gears having a constant circular pitch comprising means for rotating a hobbing cutter, means for rotating a blank, and means for producing motion whereby the hobbing cutter traverses the blank while varying in distance from the axis of the blank.

11. A hobbing machine for producing tapered spur, or tapered helical spur gears having a constant circular pitch comprising means for rotating a hobbing cutter, means for rotating a blank, means for causing the hobbing cutter to traverse the blank longitudinally thereof, and means for simultaneously moving the hobbing cutter toward the axis of the blank.

12. A hobbing machine comprising a base, a cutter head movable transversely on said base, a hobbing cutter carried by said cutter head, a carriage movable longitudinally on said base at right angles to the transverse movement of said cutter head, a blank carried by said carriage, driving connections for rotating said blank and hobbing cutter at predetermined speeds, means for feeding said carriage longitudinally, and means for simultaneously moving said cutter head transversely at a predetermined rate with respect to the longitudinal speed of said carriage.

OLIVER G. SIMMONS.